United States Patent [19]

Raghavan

[11] Patent Number: 5,014,423
[45] Date of Patent: May 14, 1991

[54] METHOD FOR FORMING A SEALED COUPLING USING A HIGH PRESSURE HOSE FITTING WITH AN O-RING TYPE SEAL

[75] Inventor: Chidambaram Raghavan, Renton, Wash.

[73] Assignee: Flow Systems, Inc., Kent, Wash.

[21] Appl. No.: 318,631

[22] Filed: Mar. 2, 1989

[51] Int. Cl.⁵ .............................................. B21D 53/00
[52] U.S. Cl. ................................. 29/890.144; 29/516; 29/517; 138/109
[58] Field of Search ............... 29/890.144, 469.5, 508, 29/516, 517, 520, 521; 285/256, 259; 138/109

[56] References Cited

U.S. PATENT DOCUMENTS

| | | |
|---|---|---|
| 1,189,821 | 5/1916 | Sundh . |
| 1,508,026 | 9/1924 | Noble . |
| 2,264,815 | 12/1941 | Thomson ............................. 285/80 |
| 3,112,939 | 12/1963 | Graham ............................. 285/238 |
| 3,120,967 | 2/1964 | Kazienko ............................. 285/231 |
| 3,287,802 | 11/1966 | Robinson et al. .................... 29/508 |
| 4,156,540 | 5/1979 | Currie ................................... 285/94 |
| 4,392,678 | 6/1983 | Adamczyk ........................... 29/508 |
| 4,445,716 | 5/1984 | Hoffman .............................. 285/55 |
| 4,486,034 | 12/1984 | Sauer ................................... 285/242 |
| 4,603,890 | 8/1986 | Huppee ............................... 285/239 |
| 4,671,542 | 6/1987 | Juchnowski ......................... 29/520 |
| 4,705,304 | 11/1987 | Matsuda .............................. 285/243 |
| 4,729,583 | 3/1988 | Lalikos et al. ...................... 285/259 |
| 4,733,890 | 3/1988 | Vyse .................................... 285/256 |
| 4,804,212 | 2/1989 | Vyse .................................... 29/508 |
| 4,844,516 | 7/1989 | Baker .................................. 285/259 |

Primary Examiner—Howard N. Goldberg
Assistant Examiner—D. Cuda
Attorney, Agent, or Firm—Hughes & Multer

[57] ABSTRACT

A high pressure hose assembly is manufactured wherein the nipple of the hose fitting includes an O-ring receiving groove formed about its periphery. The O-ring and groove are dimensioned so that the crimping of the fitting's outer sleeve causes the linear of the high pressure hose to flow into the groove, comprising the O-ring into the groove, and sealing against the O-ring within the groove.

9 Claims, 1 Drawing Sheet

METHOD FOR FORMING A SEALED COUPLING USING A HIGH PRESSURE HOSE FITTING WITH AN O-RING TYPE SEAL

This invention relates to high pressure hoses having sealed end fittings, and to a method of sealing an end fitting to a high pressure hose so that the seal is effective at the high working pressure.

BACKGROUND OF THE INVENTION

As used herein, the term "high pressure" is used to denote pressures in excess of 20,000 psi. Pressures in excess of 20,000 psi are experienced in a number of technical areas including, but not limited to, high pressure waterjet cutting. Although this particular application will be used as an example throughout this specification, it should be understood that the described invention is not so limited.

High pressure water jet cutting systems typically compress water, or other liquid, to working pressures in excess of 20,000 psi. Some of the systems, such as those manufactured by Flow Systems, Inc. in Kent Washington, operate at working pressures in the range of 30,000 to 35,000 psi. At these working pressures, the hoses preferably have burst pressures in the order of 60,000 psi.

These high pressure hoses comprise an axially-extending, nonmetallic liner of generally annular cross-section generally circumventing the hose's fluid-conducting passageway. The liner is typically formed from a thermoplastic such as Nylon or Delrin[1]. The liner is generally circumvented by an axially extending reinforcement layer, formed by multiple wraps of steel wire or Kevlar[2] filaments. Each wrap may circumvent the exterior of the liner at a different angle to the hose axis than the others.

[1]. A trademark of E. I. du Pont de Nemours and Company for synthetic resinous plastic material.
[2]. A trademark of E. I. du Pont de Nemours and Company for manmade fibers.

The hose is coupled to the source or destination of the conducted fluid by means of a generally tubular end fitting comprising a shank and a sleeve. The shank is a generally tubular member formed from stainless steel or other suitable metal, and having an internal passageway in fluid communication with the hose's passageway. Its leading end portion, referred to as the nipple, is inserted within the end of the hose. A generally tubular metal sleeve circumvents the nipple and overlying hose fitting and is swaged or crimped radially inwardly to effect a seal between the shank, hose, and sleeve.

The sealed fittings described herein are particularly directed to "large-diameter" high pressure hoses; i.e., those having fluid-conducting diameters of 0.3 inches or more. While the sealing of large diameter hose fittings at relatively low pressures has been comparatively uncomplicated, vis-a-vis the sealing of small diameter low pressure fittings, owing to the amount of space available for components of the seal, complications arise when attempts are made to seal a large diameter, high pressure fitting. In designing high pressure end fittings, as the term "high pressure" is used herein, problems which are not significant at lower pressures become significant. As the high pressure sealing arrangement becomes more complex the number of ways in which the seal can fail multiplies. There are two significant sources of sealing failures in large diameter, high pressure hoses. First, the hoses expand significantly under the high pressures described herein, owing to radial compression of the reinforcement layers. As the assembly's radial dimensions change, leaks develop within the sealing arrangement.

Second, the reinforcement layers have to be inwardly compressed by a significant amount during the swaging operation before they transmit a sufficient amount of that externally applied force to the nipple/liner interfaces to render the maintained interface pressure higher than the working pressure of the hose. The degree of required crimping gives rise to two additional problems. First, the crimping operation distorts the reinforcement layers both radially and axially; e.g., a 4 inch long sleeve when used with a 0.5 inch bore hose, may grow axially by 0.25 inches while the hose itself grows axially by 0.375 inches. The distortion of the reinforcement layers creates a region of uncertain strength on the hose adjacent to the fitting, and many hoses burst at a point within that region.

Second, the crimping process requires the crimp sleeve to be able to undergo plastic deformation with minimal springback when the crimping pressure is released. Accordingly, a low yield strength material is required. On the other hand, the sleeve must be able to maintain sufficient interface pressure so that the seal between the hose and fitting is maintained at working pressure. This, in turn, requires a high yield strength material. To meet the need for those two conflicting requirements, the most widely used materials have been 1040 mild steels and 316 stainless steels which have yield strengths in the range of 35,000–40,000 psi. As the working pressure of the conducted fluid is near that range, however, the repeated pressure cycling to which the hoses and fittings are routinely subjected in normal operation, leads to a yielding of the sleeve itself and to a consequential loss of interface pressure.

Additionally, a number of effective sealing techniques known for small diameter high pressure hoses prove inadequate when applied to large diameter hoses owing to the increased size of the seal components. The extremely high pressure of the conducted fluid translates into an exceedingly high force when acting upon a large surface area. Accordingly, an effective high pressure seal for large diameter hoses should preferably be formed by a minimal number of low surface area components.

SUMMARY OF THE INVENTION

The invention herein is a high pressure hose fitting assembly comprising a high pressure hose of the type including an axially extending, non-metallic, generally tubular liner having an inner wall surface defining a fluid-conducting passage, and a reinforcement layer generally circumventing the liner. A generally tubular shank having a nipple portion inserted within the liner, extends axially outward from the hose for coupling the hose to a high pressure fluid conduit. The nipple portion has at least one circumferential groove.

O-ring means are positioned in the groove to circumvent the nipple portion. A radially compressed, generally tubular sleeve circumvents the hose about the inserted nipple portion and creates a radially directed sealing force between the O-ring means, nipple portion and liner, with the liner being in sealing contact with the O-ring means within the groove.

In forming the above-referenced hose assembly, an O-ring groove is first machined on the outer surface of the nipple. In order to introduce the O-ring bearing nipple into the hose line without displacing the O-ring, a blank tool is first inserted into the hose liner. The blank tool, which is shaped like the nipple but possesses no barbs or grooves, is moved in and out of the liner passage until the passage has been slightly enlarged along a little more than the length through which the O-ring is to be inserted. To prevent the liner from extruding axially as the blank tool is moved in and out, a very light, low viscosity glue is first introduced between the liner and reinforcement layer by applying it to the edge of the hose, and permitting it to soak in and glue the liner and reinforcement layer together. Once the liner has been radially expanded, the nipple and mounted O-ring is inserted into the hose, and an outer sleeve is crimped or swaged radially inwardly to create a positive sealing force between the O-ring and liner. The crimping operation is preferably performed progressively in the axial direction so that axial movement of the plastic liner is minimized as it flows into the groove under the crimping force.

These and other details concerning the invention are described in greater detail below in the Description of the Preferred Embodiment, of which the drawing is a part.

DETAILED DESCRIPTION OF THE PREFERRED EMBODIMENT

Figure 1:
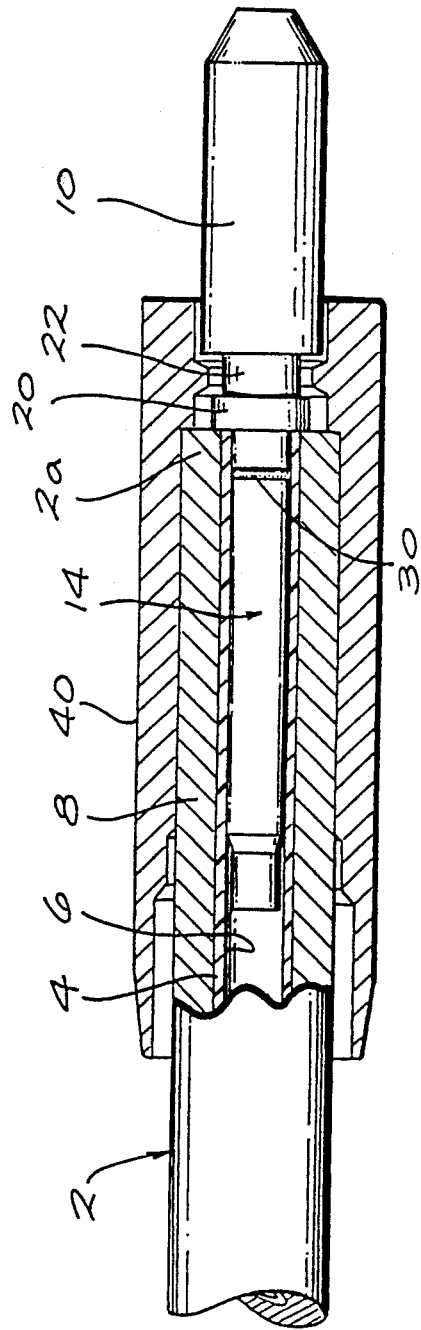
FIG. 1 is a partially sectioned view of a hose and fitting constructed in accordance with the invention.

Referring initially to FIG. 1, a partially sectioned view of a fitting constructed in accordance with the invention is shown adjacent a length of high pressure hose 2. The hose 2 comprises an axially-extending, plastic liner 4 of generally annular cross-section generally circumventing the hose's fluid-conducting passageway 6. The liner 4 is generally circumvented by an axially extending reinforcement layer 8, formed by multiple wraps of steel wire or Kevlar filament. Each wrap may circumvent the exterior of the liner at a different angle to the hose axis than the others. High pressure hoses of the type described herein are manufactured and distributed by Polyflex Schwarz, GmbH. (Lambertheim-Huttenfeld, Fed. Rep. of Germany) under the designation, "Polyflex 6013ST".

Figure 2:
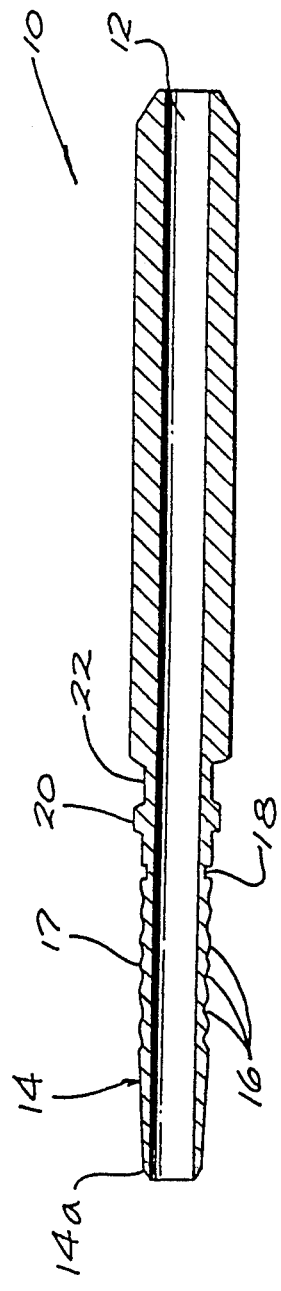
FIG. 2 is a sectional view of the shank portion of the fitting shown in FIG. 1.

The hose 2 is coupled to a source or destination 3 of the conducted fluid by means of a generally tubular end fitting comprising a stainless steel sleeve 40 and a generally tubular, stainless steel shank 10 having an internal fluid-conducting passage 12 (FIG. 2). The shank 10 includes a nipple portion 14 which is adapted for insertion into a high pressure hose, as discussed below. As is the case with conventional nipples, the nipple 14 has a number of circumferential grooves 16 and bumps 17 (FIG. 2) which physically grip the interior wall of the liner during crimping to secure the nipple therein.

The shank is more clearly illustrated in FIG. 2. When dimensioned for use with ¼ inch high pressure hoses, the nipple is tapered at approximately 3° from an approximately 0.4 inches diameter leading end 14a to 0.5 inch diameter dimension adjacent an approximately 0.625 inch diameter shoulder 20. The shoulder 20 is approximately 2.5 inches from the leading end of the nipple. The nipple has a diameter of approximately 0.5 inches on the other side of the shoulder at the region identified the numeral 22, and the shank thereafter has a diameter of approximately 0.71 inches for the remainder of its length.

In accordance with the invention, the nipple 14 is provided with an O-ring receiving groove 18 at a position where the nipple's O.D. is approximately 0.5 inches. The groove is approximately 0.033 inches deep and 0.067 inches wide. The depth of the groove must be deep enough to prevent the O-ring from slipping out during insertion of the nipple in the hose, but must leave enough underlying metal below the groove to provide structural soundness and prevent cracking of the nipple under pressure. An O-ring 30 (FIG. 3) is positioned in the groove. The O-ring 30 has an inner diameter of approximately 0.426 inches, a cross-section diameter of approximately 0.05 inches and is preferably formed from Buna-N having a hardness of 70 durometer, or other material which is characterised by good extrusion strength. In practice, O-rings made by Parker Seals in Lexington, Kentucky and sold as Part No. 5-058 N304 have been found to be suitable.

In selecting suitable O-ring and groove dimensions for other sizes of high pressure hose fittings, certain criteria should be followed. First, the internal diameter of the O-ring should be slightly smaller than the groove diameter so that it fits snugly within the groove. Second, the groove depth should be slightly larger than half the thickness of the O-ring in order to provide sufficient support to the O-ring as it is inserted into the hose. The term "thickness" as used in the preceding sentence refers to the dimension of the O-ring between its inner and outer diameters. Third, the groove depth must not compromise the fatigue life of the nipple by reducing its wall thickness to too great an extent. Fourth, the liner should compress the O-ring into the groove as the fitting is crimped. This will cause the O-ring to flatten and assume an almost rectangular shape. The width of the groove is selected to permit this. Fifth, the O-ring material must be able to resist corrosion of any chemicals which are carried by the high pressure fluid. Sixth, it is preferable that the selected O-ring be easily obtained commercially.

A second O-ring (not shown) is placed about the nipple within a groove 19. The characteristics of the groove 19 and second O-ring are the same as that previously described in connection with the groove 18 and O-ring 30. Although it is not clear that the second O-ring and groove 19 is necessary, it is desirable to include it as a precaution.

To prepare the high pressure hose for insertion of the nipple and mounted O-ring, a blank tool having the same general shape as the nipple 14, but without the bumps and grooves, groove and O-ring, is used to slightly expand the liner 4 of the hose. The blank tool is moved in and out of the liner passage 6 until the passage has been slightly enlarged along a little more than the length through which the O-ring 30 is to be inserted. To prevent the liner from extruding axially as the blank tool is moved in and out, a very light, low viscosity glue is first introduced between the liner and reinforcement layer by applying it to the edge of the hose 2a, and permitting it to soak in and glue the liner and reinforcement layer together. In practice a glue sold as Pacer Tech Zap-Ca PT-02, which is found in numerous hobby shops, has been found suitable for this application.

Once the liner has been radially expanded, the greased nipple 14 and mounted O-rings 30 are inserted into the hose before the liner can relax back to its initial dimension, and the outer sleeve 40 is crimped or swaged radially inwardly to create a positive sealing force between the O-ring and liner. The crimping operation is preferably performed progressively in the axial direction so that axial movement of the plastic liner is minimized as it flows into the groove under the crimping force. The operation is preferably repeated, with the hose assembly being rotated approximately 10° each time, to remove visible marks left by the crimping operation, and to insure positive sealing contact between the components.

Figure 3:
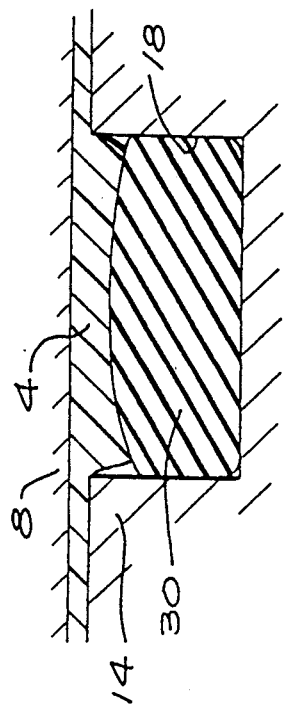
FIG. 3 is an enlarged view of the hose liner and shank-mounted O-ring in sealing contact in accordance with the invention.

FIG. 3 is an enlarged view of the interface between the O-ring and hose liner subsequent to the crimping operation. As shown in FIG. 3, the crimping force is sufficient to cause the plastic of the liner to flow into the O-ring groove 18. The groove is sufficiently wide to accommodate the resiliently distorted O-ring as it spreads under compression by the plastic liner. Consequently, the liner and O-ring form a seal within the groove which is sufficiently tortuous to resist the leakage of high pressure fluid. The O-ring also seals against the metal surfaces of the groove, and the pressure of the conducted fluid enhances the blockage of any leaking fluid as the fluid pressure presses the O-ring into contact with the groove walls.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

I claim:

1. A method for sealing a hose fitting to a high pressure hose of the type including an axially-extending, generally tubular non-metallic liner having an internal fluid-conducting passage, and a reinforcement layer generally circumventing the liner, the hose fitting being generally tubular in shape and including an axially-extending nipple portion adapted to be fit within one end of the hose, the method comprising the steps of
placing a resilient annular member about the nipple portion in a circumferential groove formed therein;
placing an outer sleeve around the high pressure hose;
expanding the radial dimension of the passage via a generally reciprocal movement of a blanking tool having the same general shape as the nipple portion;
inserting the nipple portion and mounted annular member into the expanded passage of the liner;
compressing the outer sleeve radially inward about the hose and nipple portion with sufficient force to cause the liner material to flow into the groove and compress the resilient annular member therewithin.

2. The method of claim 1 wherein the compressing step is performed by compressing the sleeve progressively in the axial direction.

3. The method of claim 2 wherein the compressing step is initiated at the end of the sleeve furthest from the hose.

4. The method of claim 2 wherein the compressed hose and fitting are rotated slightly about the hose axis, and the fitting is again progressively compressed in the axial direction subsequent to the rotation.

5. The method of claim 4 wherein the hose and fitting are rotated approximately 10° between compression steps.

6. The method of claim 2 wherein the progressive compression step is performed by compressing the sleeve a plurality of times, each compression of the sleeve being centered about a region which is progressively closer to the hose end of the fitting.

7. The method of claim 6 including the step of rotating the hose and fitting about the hose axis between each of the plurality of compression steps.

8. The method of claim 7 wherein the hose and fitting are rotated approximately 10° between compression steps.

9. A method for forming a high pressure seal between the plastic liner of a high pressure hose and the metal nipple of the hose fitting comprising the steps of:
placing a generally resilient, torroidal O-ring like member within a circumferential groove formed on the nipple of the fitting, the thickness of the O-ring like member between its inner and outer diameters being less than twice the depth of the groove, the width of the O-ring like member between its two faces being sufficiently less than the corresponding dimension of the groove so that the member's width can expand within the groove and substantially fill the groove when the member is compressed into the groove;
placing an outer sleeve around the high pressure hose;
inserting the nipple and mounted torroidal member into the hose; and
compressing the outer sleeve radially inward about the hose and nipple with sufficient force to cause the liner material to flow into the groove and compress the resilient annular member therewithin.

* * * * *